United States Patent
Kraaij et al.

(10) Patent No.: US 11,310,992 B2
(45) Date of Patent: *Apr. 26, 2022

(54) MILKING ROBOT WITH CYLINDER SYSTEM

(71) Applicant: LELY PATENT N.V., Maassluis (NL)

(72) Inventors: Dirk Kraaij, Maassluis (NL); Gerard Mostert, Maassluis (NL); Michiel Brevet, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 967 days.

This patent is subject to a terminal disclaimer.

(21) Appl. No.: 15/752,670

(22) PCT Filed: Aug. 2, 2016

(86) PCT No.: PCT/NL2016/050566
§ 371 (c)(1),
(2) Date: Feb. 14, 2018

(87) PCT Pub. No.: WO2017/034398
PCT Pub. Date: Mar. 2, 2017

(65) Prior Publication Data
US 2018/0235170 A1  Aug. 23, 2018

(30) Foreign Application Priority Data

Aug. 27, 2015 (NL) .................................. 2015356

(51) Int. Cl.
*A01J 5/017* (2006.01)
*F15B 15/14* (2006.01)
(Continued)

(52) U.S. Cl.
CPC ............. *A01J 5/0175* (2013.01); *A01J 5/007* (2013.01); *A01J 5/04* (2013.01); *A01K 1/12* (2013.01);
(Continued)

(58) Field of Classification Search
CPC ... A01K 1/12; F15B 15/1428; F15B 15/1438; A01J 5/017; A01J 5/0175; A01J 5/02;
(Continued)

(56) References Cited

U.S. PATENT DOCUMENTS 3,991,716 A * 11/1976 Reisgies .................. A01J 5/017
119/14.08
4,188,910 A * 2/1980 Hocker ..................... A01J 5/01
119/14.08
(Continued)

FOREIGN PATENT DOCUMENTS

| DE | 263 017 A1 | 12/1988 |
| JP | 2005-282712 A | 10/2005 |
| WO | 99/25177 A1 | 5/1999 |

OTHER PUBLICATIONS

International Search Report dated Nov. 8, 2016 in PCT/NL2016/050566 filed Aug. 2, 2016.

*Primary Examiner* — Peter M Poon
*Assistant Examiner* — Danielle A Clerkley
(74) *Attorney, Agent, or Firm* — Oblon, McClelland, Maier & Neustadt, L.L.P.

(57) ABSTRACT

A milking robot for automated milking of milking animals, comprising a cylinder supporting movement of at least one movable component. The cylinder has a wall with a ventilation opening and a cylinder rod which can move in and out of the cylinder. The cylinder wall surrounds at least one variable volume part for movement of the cylinder rod. The opening configures the cylinder to remain in virtual pressure equilibrium with an environment. A gas capture device is connected which has a variable volume and which together with the variable volume part, forms an air-tight gas volume. Thus the variable volume part is kept at almost ambient pressure, so that no unnecessary counter-pressure occurs in the cylinder, during extension and retraction of the cylinder (Continued)

rod. Also less to no exchange of gas and dirt with the environment can take place for longer life and better reliability of the cylinder.

17 Claims, 3 Drawing Sheets

(51) Int. Cl.
    *A01J 5/007*     (2006.01)
    *A01J 5/04*     (2006.01)
    *A01K 1/12*     (2006.01)
    *B25J 11/00*     (2006.01)

(52) U.S. Cl.
    CPC ....... *B25J 11/0045* (2013.01); *F15B 15/1428* (2013.01)

(58) Field of Classification Search
    CPC .... A01J 5/04; A01J 5/047; A01J 5/048; A01J 7/00; A01J 7/005
    USPC ............................ 119/14.01–14.55; 92/117 R
    See application file for complete search history.

(56) References Cited

U.S. PATENT DOCUMENTS

| | | |
|---|---|---|
| 6,386,141 B1 | 5/2002 | Forsen et al. |
| 2007/0221055 A1 | 9/2007 | Dorval |
| 2010/0251965 A1* | 10/2010 | Lingard ................. A01J 5/017 119/14.08 |

\* cited by examiner

MILKING ROBOT WITH CYLINDER SYSTEM

The invention concerns a milking robot for fully automatic milking of milking animals, comprising at least one movable component and a cylinder configured to support a movement of the component, which cylinder has a cylinder wall with a ventilation opening and a cylinder rod which can move in and out of the cylinder, wherein the cylinder wall surrounds at least one variable volume part. Such milking robots are now well known in the prior art. Each milking robot with such a cylinder has a part which can extend and retract, and cause said component to move. The space in which the extending and retracting part moves has a variable volume due to said extension and retraction. If this variable volume is closed air-tightly from the outer world, this can lead to undesirable pressure differences. If the variable volume is in fluidic connection with the environment, dirt or moisture can be drawn in. In particular in a milking parlor environment in which a milking robot is used, a great deal of dirt is present such as ammonia and other corrosive gases, urine and dung from milking animals, and flies, dust etc.

Such cylinders may for example be single-action gas pressure cylinders. In the prior art, electric cylinders are also known, such as those made by the company Festo, wherein a linear motor drives a piston shaft. When the piston rod moves, the internal volume of the cylinder changes and air can be compressed or drawn in. In all cases, a pressure difference from the external environment occurs which can lead to a disruption of the correct function of the cylinder and to leakages of moisture, dust and corrosive substances—such as ammonia, dung or urine as occur in a milking parlor—past the seals.

Until now, there has been no satisfactory solution to the above problem.

It is therefore an object of the present invention to solve the above-mentioned problem at least in part, and to offer a usable choice for the public.

The invention proposes a milking robot according to claim 1, in particular a milking robot for fully automatic milking of milking animals, comprising at least one movable component and a cylinder configured to support a movement of the component, which cylinder has a cylinder wall with a ventilation opening and a cylinder rod which can move in and out of the cylinder, wherein the cylinder wall surrounds at least a variable volume part, which volume part is free from pressurized fluid connections for movement of the cylinder rod and is also configured, via said opening, to remain in or come into virtual pressure equilibrium with an environment of the cylinder, i.e. atmospheric pressure, wherein on the cylinder wall around said ventilation opening, a gas capture device is connected which has a variable volume and which together with the variable volume part, forms an air-tight gas volume.

Thus, by giving the cylinder or the variable volume part thereof a variable volume by means of the gas capture device, no undesirable build-up of over-pressure or reduced pressure can occur, so the correct function of the cylinder can be better guaranteed, both with regard to the function itself and with regard to the lesser contamination thereof. In all cases, no external air with associated contamination need be drawn in since the system as a whole is closed.

The term "virtual pressure equilibrium" means that the pressure difference between the variable volume part or the gas capture device firstly and the environment secondly is at most equal to 0.2 bar, advantageously at most equal to 0.1 bar, and more advantageously at most equal to 0.05 bar. Also, the environment will largely have atmospheric pressure.

According to the invention, the cylinder system is therefore in principle complete and permanently air-tight. Therefore no contamination can occur other than by leakage. It is for example possible to fill the cylinder or its variable volume part with an inert gas such as (dry) air, nitrogen, argon etc.

It is known for example to provide an electric cylinder with an opening in the wall to allow the interior to communicate with the environment. The opening is provided with a filter to prevent the penetration of dust and dirt, and where applicable moisture. It is clear that in this way gases cannot be held back, or only with great difficulty, and a filter can also slowly but surely become clogged, in particular in a heavily contaminated environment of a milking parlor. Thus correct function cannot be guaranteed.

Also, a solution in which an air-tight bellows is created from the cylinder wall up to and including the extendable and retractable cylinder rod, is often impractical. On each movement of the cylinder rod, such a bellows would be stretched or compressed more than necessary to absorb a volume change of the air.

The bellows must always inflate to offer space for the displaced air at almost constant pressure. Certainly on a robot arm, an increasing volume of one or more parts thereof is often undesirable. Also, it is possible to provide a ventilation opening in this bellows but this achieves little other than shifting the ventilation problem. Note that, according to the present invention, the gas capture device may be present at any desired point on the cylinder wall around the variable volume part, so that the location of the increasing volume of the gas capture device can be selected largely freely. Also, in the known solution, in contrast the bellows always moves over a constricted part of the cylinder, namely where the piston rod protrudes from the cylinder. There the bellows can still catch and by friction wear at that point.

It is also known in pneumatic cylinders, such as Namur Breather Blocks by the company Habonim, to capture used compressed air or other gaseous pressurized medium in order to make it available if a pressureless part of the cylinder must be increased in volume. The surplus compressed air is then ventilated to the environment. Thus the inflow of corrosive medium can be prevented. Apart from the circumstance that such Breather Blocks are unnecessarily complex with various valves and pipes, there is still the risk that slowly but surely, moisture, dust and similar can penetrate into the inside. New medium must always be supplied, whereby the supply cannot always be guaranteed to be free from contamination. The medium must always be supplied to the compressor which delivers the compressed air, and the medium thus passes through one or more filters and pumps.

According to the invention, a fully closed system is created which, once filled with clean and dry gas such as air or nitrogen or similar, in principle remains free from contamination.

According to the invention, the gas capture device is connected to the cylinder wall around said ventilation opening. This means that the gas capture device extends as a closed wall around said ventilation opening and on the cylinder wall. It is emphatically excluded that the gas capture device is connected like a bellows from the cylinder wall to the cylinder rod, since such a bellows cannot be attached fully around the ventilation wall but only on one side around the cylinder wall. Because, according to the present invention, the gas capture device is connected around the ventilation opening, this is now mechanically fully decoupled from movements of the cylinder rod and therefore does not have the disadvantages that apply to such a bellows.

Moreover, in this application the term "cylinder rod" is used where the term "piston rod" is normal. Since electric cylinders do not necessarily need a piston, the more general term "cylinder rod" has been chosen to indicate the extendable and retractable rod of the cylinder.

Advantageous embodiments of the invention are described below and given in the description of the figures which follows. For example, it is still possible to fit a bellows from a cylinder wall to a part of the cylinder rod which always remains outside, or to the movable component connected therewith. This bellows can move like a harmonica without "inflating", i.e. increasing in cross-section, since the gas capture device can absorb an excess of gas. In this embodiment, not only is a gas exchange excluded, but also a soiling namely of the cylinder rod, via which possibly dust may enter the variable volume part. Nonetheless, for such bellows the same disadvantages apply as already described for the prior art. In addition, it is noted that such bellows may also obstruct control and pressure lines.

In embodiments of the invention, the gas capture device is connected to the variable volume part in gas connection via a pipe or line around the ventilation opening. This offers the advantage that the actual gas capture device may be established at some distance from the cylinder, so that this does not hinder movements of the cylinder and/or the movable component. The pipe or line itself may for example be made of a rigid material so that admittedly no volume change can occur therein, but there is less chance of damage by movement of the movable component or similar.

In embodiments, the gas capture device comprises a flexible gas capture pouch or a capture cylinder with a floating piston. Such a flexible gas capture pouch is ideal for absorbing the volume change without causing (strong) pressure fluctuations due to a high resistance. The gas capture pouch may be connected directly around said ventilation opening or via the above-mentioned pipe or line, and thus be established at a protected location. Such a gas capture pouch is not particularly restricted and may be made of any materials such as plastic, leather etc. Alternatively or additionally, the gas capture device comprises a floating capture cylinder. The capture cylinder is then evidently connected to a closed part of variable volume, for example a pipe or line which in turn is connected around the ventilation opening. Note that the other part of the capture cylinder should be in open connection with atmosphere or the environment, so that in fact the ventilation problem is shifted to the capture cylinder. This may however be established at a cleaner location so that the load from dust, aggressive media or similar is much lower. Also, alternatively it is possible to give the capture cylinder a much greater volume than the variable volume part, and still close it air-tightly. Thus no gas exchange occurs but the pressure difference in the variable volume part is much smaller than without the capture cylinder.

In embodiments, the gas capture pouch is arranged in a form-stable outer housing, in particular a pipe of the milking robot. In this way, the gas capture pouch can be better protected against damage from outside, such as by kicks or similar from milking animals. Often, a milking robot comprises a control box or similar, or also a frame in which the gas capture pouch can easily be accommodated and protected.

In embodiments, the gas capture device has a volume which, by supply of gas from the volume part of the cylinder, is variable between a minimum and a maximum volume, wherein a gas pressure in the gas capture device on reaching the maximum volume amounts to maximum 2 bar. In particular, the gas pressure amounts at most to approximately ambient pressure. If the gas capture device, for example the gas capture pouch, is sufficiently flexible, the pressure will almost always correspond approximately to the ambient pressure. Evidently, at the smallest volume of the gas capture device, the pressure will be approximately equal to the ambient pressure or even slightly lower.

In embodiments, the cylinder is a pressure cylinder such as a (hydro)pneumatic or hydraulic cylinder, which pressure cylinder, besides the variable volume part, comprises a variable pressure volume part for receiving a pressurized fluid such as oil or compressed air. These are common types of cylinder which often have a long hose when used in a milking robot. Therefore the displaced volumes of air or gas will also often be large.

In embodiments, the pressure cylinder is in particular a balancing cylinder for supporting the weight of at least a part of the robot arm. A balancing cylinder here means a cylinder which is pressurized as standard and which supports the robot arm from below, in order to compensate for a part of the weight. In this way the controls of robot arm, i.e. the required actuators, can be made lighter. Also, such a pressure cylinder often has a long hose and therefore a significantly large displaced volume of gas.

In embodiments, the milking robot comprises in particular a pneumatic, hydraulic or hydropneumatic drive which is configured for moving a pressurized fluid to or from the pressure volume part. Thus also the one or more drives are created for the one or more cylinders, for performing the movements of the movable component. Also, alternative drives are possible, as will be explained below.

In embodiments, a filter is placed between the variable volume part of the or each pressure cylinder firstly and the gas capture device and the variable volume part of any other said cylinder, which filter is configured to filter a gas flowing through. Such a filter may be used if a leak occurs in the pressure cylinder, whereby namely pressurized gas leaks from the pressure volume part to the variable volume part of the pressure cylinder, and from there to the gas capture device and any variable volume parts of the other cylinder or cylinders connected therewith. The filter can retain at least the dust and dirt carried. In addition, advantageously an over-pressure valve is fitted which for example opens at a predefined pressure such as 1.2 or 1.5 bar, in any case a pressure which is higher than the highest pressure to be expected in the gas capture device. Thus any leaking pressurized gas can escape from the pressure cylinder without further damage to the gas capture device. In these embodiments therefore, there are no cylinders which are not connected to the gas capture device.

In embodiments, the cylinder has an electric, magnetic or electromagnetic drive for extending or retracting the cylinder rod. These are alternative drives which do not work with a pressurized fluid but with a direct mechanical drive. Nonetheless, here again volume changes occur because the cylinder rod takes up little or less space in the variable volume part.

In embodiments, the milking robot comprises several cylinders which are connected with their respective said variable volume parts to one gas capture device. It is in principle possible to connect each cylinder with its variable volume part to a separate gas capture device. Advantageously however, several cylinders are connected to one gas capture device, wherein connections are only created between the gas capture device, such as the gas capture pouch, and the respective variable volume parts. It will be clear that this is not possible with a bellows structure from the cylinder wall to the piston rod, as known from the prior art.

In embodiments, the several cylinders comprise at least one first cylinder without a respective variable pressure volume part, and at least one second cylinder with a respective variable pressure volume part, wherein all first cylinders with their respective said volume parts are connected to one first gas capture device, and in particular wherein also all second cylinders with their respective said volume parts are connected to one second gas capture device. In these embodiments, two gas capture devices are created wherein all variable volume parts of cylinders without variable pressure volume part are connected to a first gas capture device, and the respective variable volume parts of cylinders with such a variable pressure volume part (which therefore can supply a much higher pressure on leakage of the associated piston) are connected to a second gas capture device. Thus in any case on leakage of one pressure cylinder, the other cylinders are protected from possible over-pressure.

In this embodiment, as in general for all embodiments, the gas capture device in use has a minimum volume and a maximum volume, wherein the difference between the minimum and maximum volumes is at least equal to the sum of the maximum volume changes of all variable volume parts of all cylinders connected therewith. Advantageously, this takes into account the respective working ranges of the cylinders. Thus if all cylinders are moved such that the variable volume part is reduced to a minimum, and hence a maximum quantity of air or gas is expelled to the gas capture device, the latter assumes its greatest volume. Advantageously, it is possible to choose a smaller maximum volume for the gas capture device, precisely if the working range selected for the milking robot is served by the cylinders such that the extension of a first of all cylinders is paired with a retraction of the other of all cylinders. This offers the advantage that the greatest volume of the gas capture device can be selected smaller.

In embodiments, the gas capture device and all volume parts communicating therewith are filled with a gas, in particular air, which gas has a pressure of around 1 atmosphere. This air may for example be clean air, such as dry air. An inert gas may also be used, such as nitrogen or a noble gas or similar. A pressure of around 1 atmosphere means that this deviates by maximum 10% from 1 atmosphere.

In embodiments, the milking robot comprises a milking stall with an entry door and an exit door, and a robot arm for performance of animal-related actions on a milking animal in the milking stall, such as connection of a teat cup, and wherein a said cylinder is provided in at least one of said entry door, said exit door and said robot arm. In this embodiment, some concrete movable components are named which may be moved using such a cylinder. Also here respective actuators are provided for the actual movement of the entry door, exit door or robot arm. The actuators may comprise one or more of the above-mentioned actuators, such as a pneumatic or electromagnetic drive. However it is noted here that the invention may also be applicable to cylinders with associated gas capture device according to the invention in other applications in a parlor environment than a milking robot, such as a feed fence, a selection fence etc.

The same problem also arises in a parlor environment with animals other than milking animals, such as pigs or other meat animals.

The invention is now explained in more detail with reference to the drawing which shows some embodiments in diagrammatic form, and in which.

Figure 1:
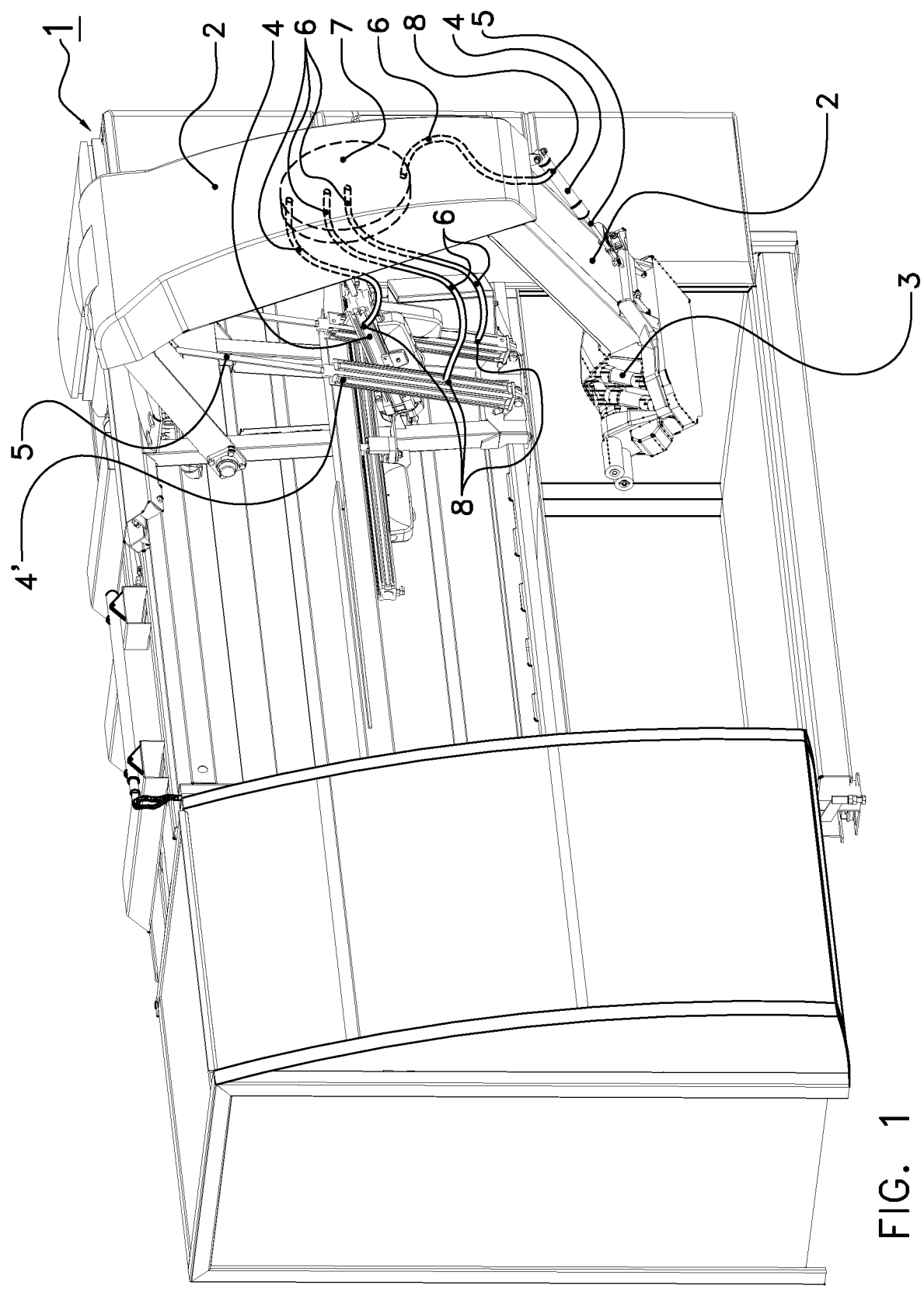
FIG. 1 is a diagrammatic, perspective view of a milking robot according to the invention.

FIG. 1 shows a diagrammatic, perspective view of a milking robot 1 according to the invention. The milking robot 1 comprises robot arm parts 2 which are movable for connection of milking cups 3 to a cow or other milking animal, not shown here. The arm parts 2 are moved by means of cylinders 4, 4' with cylinder rods 5. Also shown are gas pipes 6 which run from the cylinders 4, 4' to a gas capture pouch 7. For this, respective ventilation openings 8 are made in the cylinders 4, 4'.

The milking robot 1 shown and known in itself comprises a robot arm which is used for example to connect milking cups 3 to the teats of a milking animal, or to perform other actions such as cleaning, stimulating or treating the teats. For this, the milking robot comprises for example a teat detection system, not shown here in detail. To move the robot arm parts 2, actuators are provided in the form of cylinders 4, each with a cylinder rod which can move in and out of a variable volume part in the cylinder. This extension and retraction changes the volume of the variable volume part. If the variable volume part is closed fully or almost air-tightly, the pressure in the volume part will change as a result. This may not only undesirably influence the movement of the cylinder rod, but also such a pressure difference from the environment makes it possible for gas to be exchanged with the environment. On reduced pressure, ambient gas (which may be aggressive or corrosive), moisture, dirt etc. can penetrate into the inside. On over-pressure (when the cylinder rod is retracted), gas can escape, whereby on extension of the cylinder rod, finally a reduced pressure can occur with the risks described above.

To compensate for this disadvantage, ventilation openings 8 are created in the cylinders 4, 4', to which respective gas pipes 6 are attached which lead to a gas capture pouch 7. Thus a gas exchange can occur with the flexible gas capture pouch, without any substantially unnecessary pressure difference occurring in the cylinder. It is easily possible for the gas capture pouch, by means of volume enlargement, to prevent or at least greatly limit a pressure difference, for example to maximum 0.2 atmosphere or any other pre-defined value. This may be defined in advance by calculation on the basis of a maximum volume change of the variable part (or parts) or on the basis of sampling.

Evidently, in some types of cylinders, part of the cylinder may be brought under pressure with a pressure fluid, such as oil or air, for displacement of the cylinder rod, such as a pneumatic or hydraulic cylinder. In this case it is possible that the other part of the cylinder is the variable volume part described above. In all cases, of all cylinder volume parts of a cylinder system which are not filled with such a pressurized fluid, advantageously at least one is connected by a gas pipe 6 to a gas capture pouch 7. The cylinders 4, 4' shown may be single-action cylinders, wherein the weight of the robot arm part which can be moved by the cylinder, or other movable part, can ensure the return movement. In such a case, the invention creates the possibility of a ventilated volume part which need not be filled with pressurized fluid. With a double-action cylinder, this is in principle not the case.

Figure 2:
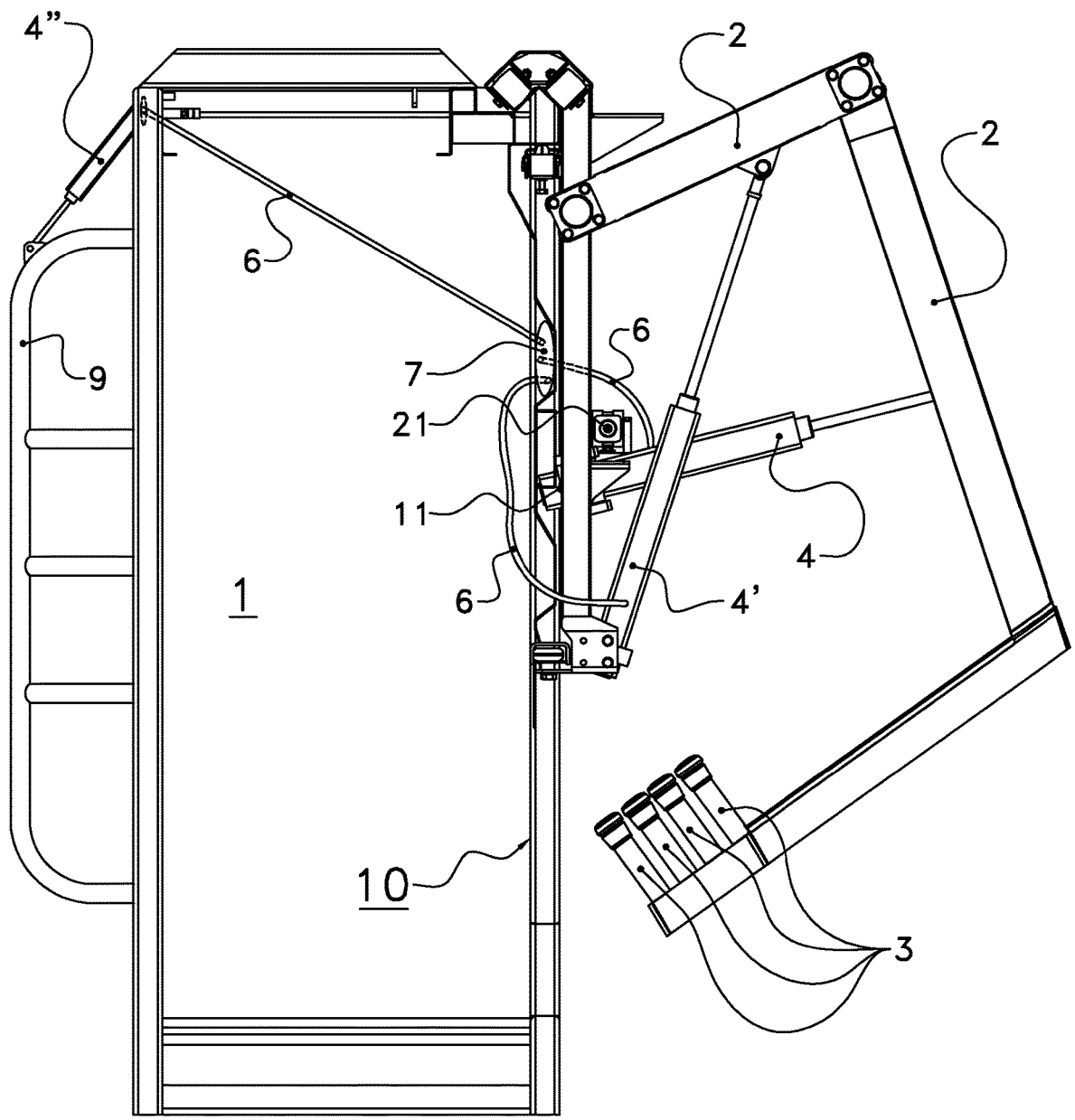
FIG. 2 is a diagrammatic side view of a milking robot according to the invention.

FIG. 2 shows a diagrammatic side view of a milking robot 1 according to the invention. Throughout the drawing, similar components are indicated with the same reference numeral. In this embodiment, an entry door 9 is also shown which may also be operated with a cylinder 4'' which is connected to the gas capture pouch 7 via a gas pipe 5. It is clear that any cylinder which moves a component in or near the milking robot, such as an exit door or a movable feed trough, advantageously forms part of the gas exchange system, i.e. is connected to a gas capture pouch via a gas exchange opening and a gas pipe. Note that the pouch may also be a cylinder in floating state. An advantage of such a cylinder is that this can be made more rigid than a pouch, which is necessarily flexible. Naturally, placing this in a rigid housing ensures the desired rigidity. Therefore here the gas capture pouch 7 is placed in a frame pipe 10 of the milking robot 1 and is thus well protected from mechanical and other environmental influences.

This embodiment does not show the use of a balancing cylinder which for example may serve to largely compensate for the weight of the robot arm parts 2, whereby the drive by the respective cylinders 4 becomes easier. Such a balancing cylinder may for example be used in addition to the cylinder 4'. Both will be explained in more detail with reference to FIG. 3.

Figure 3:
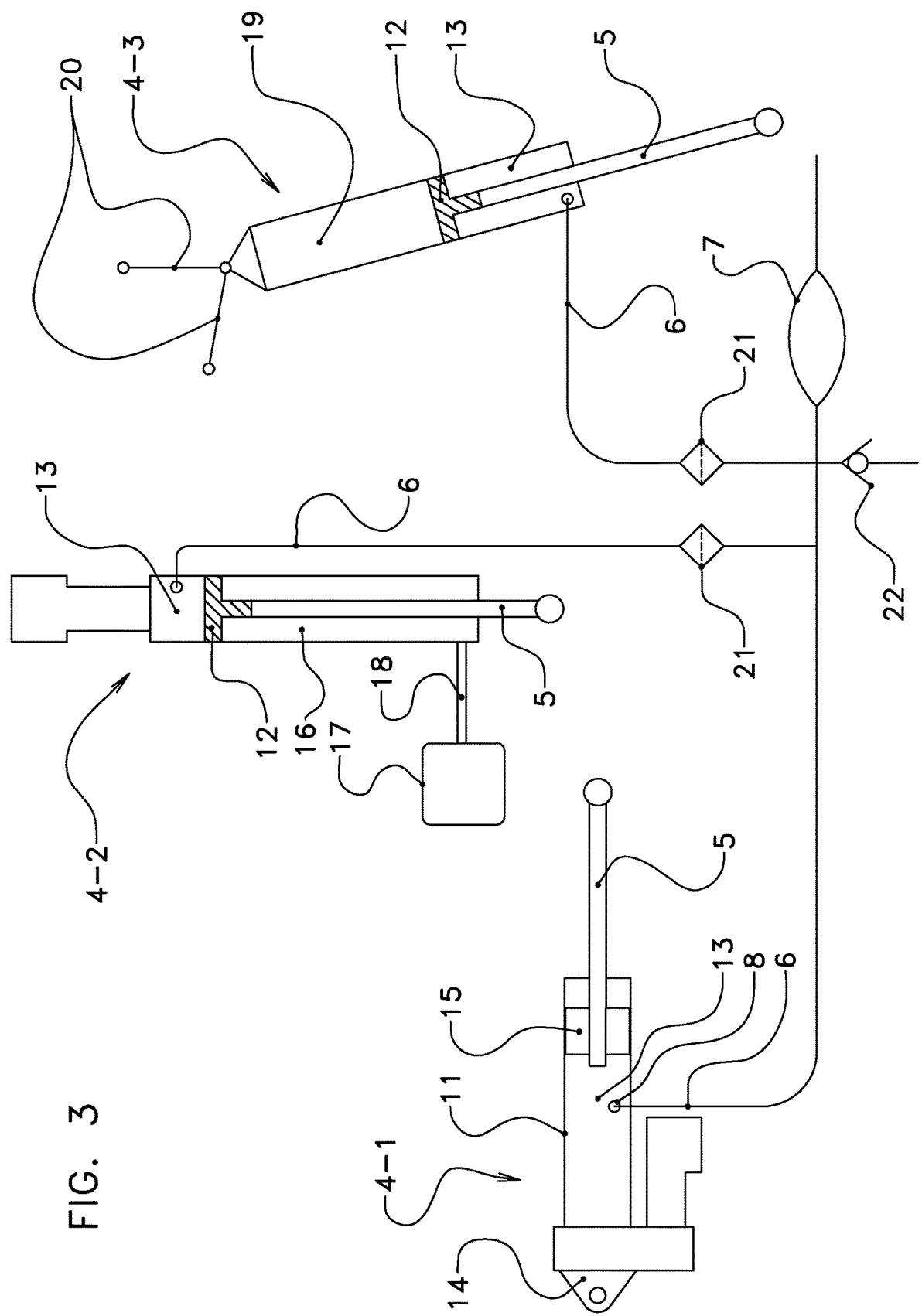
FIG. 3 shows a diagrammatic overview of a mechanical drive of a milking robot according to the invention.

FIG. 3 shows a diagrammatic overview of some parts of the milking robot according to the invention which serve for mechanical drive of movable parts of the milking robot.

4-1 indicates an electric cylinder with a cylinder wall 11 in which a cylinder rod 5 can slide into and out of the variable volume part 13 under the influence of an electromechanical drive, here comprising a supply 14 and a motor 15. Both are indicated highly diagrammatically and may also be replaced by other electric cylinders known in themselves.

The cylinder wall 11 comprises a ventilation opening 8 to which a gas pipe 6 is connected. It is important here that the gas pipe 6 is attached all round, preferably directly around the ventilation opening 8 on the cylinder wall 11, wherein in general the gas pipe 6 is thus mounted statically and/or immovably around the ventilation opening 8. Thus the gas pipe 6 cannot come into contact with other parts of the milking robot due to a movement relative to the cylinder wall 11, or wear more quickly due to mechanical stress.

At the other end, the gas pipe 6 is connected to the gas capture pouch 7. This is a capture pouch 7 made of stretchable material, such as rubber or another plastic which can expand freely if gas is displaced into this pouch 7. It is possible here that in the capture pouch 7, the gas is not under any counter-pressure due to the inherent elasticity of the pouch, but advantageously this is as small as possible and the gas pressure in the gas capture pouch 7, the gas pipe 6 and the variable volume part 13 remains approximately equal to ambient pressure. Thus there is only a very small chance of the inward leakage of ambient air, dirt etc. Also, on the inward and outward movement of the cylinder rod 5 in and out of the variable volume part 13 of the electric cylinder 4-1, a pressure change could still occur in the variable volume part 13 if this were closed fully air-tightly. Due to the pressure difference from the environment, dirt, moisture and/or ambient air could pass along the seal of the cylinder rod 5 and enter the cylinder 4-1. By means of the gas pipe 6 and the gas capture pouch 7, a pressure balancing is possible, so that this chance becomes very much smaller.

In addition, any pressure difference cannot have a negative effect on the movement of the cylinder rod 5 using the motor 15. The function of the electric cylinder 4-1 is then also improved according to the present invention.

For example, one of the robot arm parts 2 can be moved and/or swivelled using the electric cylinder 4-1. Also another robot arm part 2 can be moved using the hydraulic cylinder 4-2. For example, a hydraulic cylinder 4-2 may be used if very large forces must be applied to move a robot arm part or another movable component, wherein it is not possible or only possible with difficulty to apply a weight or other compensation. Nonetheless, often all cylinders used within the milking robot are of the same type.

The hydraulic cylinder 4-2 shown in FIG. 3 comprises a piston 12 with cylinder rod 15, and a variable pressure volume part 16 which is connected via a pressurized fluid line 18 to a hydraulic drive 17, and a variable pressure volume part 13 which is connected by a gas pipe 6 to the gas capture pouch 7. A filter 21 is arranged in the gas pipe 6 for filtering for example any penetrating dirt, or also fluid residue from the hydraulic circuit. In this hydraulic cylinder 4-2, again the variable volume part 13 is in principle pressureless so that any inward leakage of gas from the environment is countered as far as possible. Evidently, there are also (many) hydraulic cylinders in which fluid is present on both sides of the piston. These do not have a variable volume part which is free from pressure fluid connections, and therefore fall outside the scope of the invention.

FIG. 3 also shows a gas spring 4-3 which for example may serve as weight compensation, see the weight compensation described for FIG. 1. The gas spring 4-3 comprises, as well as the variable volume part 13, a gas cell 19 in which a quantity of gas is enclosed which, on extension and retraction of the piston 12, may provide counter-pressure for a cylinder rod 5 and thus compensate for the weight of the movable component attached thereto. For example, for this a rod system 20 is created for attaching the gas spring 4-3 and controlling it relative to one or more robot arm parts, the weight of which must be compensated. Details of such a weight compensation are of no further relevance to the invention and will not therefore be explained further here. Again, the variable volume part 13 is connected by means of a gas pipe 6, with filter 21 therein, to the gas capture pouch 7. It is also clear that all gas pipes 6 are connected to the same gas capture pouch 7. It is also possible to create several gas capture pouches 7, such as one gas capture pouch per variable volume part. It is also possible for all variable volume parts 13 of cylinders which also contain pressurized fluid, such as in this case the hydraulic cylinder 4-2 and the gas spring 4-3, to be connected to one or more gas capture pouches, and also for all variable volume parts 13 of cylinders without such pressurized fluid, such as the electric cylinder 4-1, to be connected to one or more other gas capture pouches. Thus it can be prevented that if a leak nonetheless occurs from a variable pressure volume part to a variable volume part 13 free from pressurized fluid, no complex air or other (pressurized) fluid can move to the other variable volume parts of other cylinders.

In addition, it is possible, as shown in FIG. 3, to create a pressure relief valve 22 on one or more of the gas pipes 6. This relief valve 22 is for example a non-return valve which opens if the pressure lies for example more than 0.2 or 0.5 bar above ambient pressure. In this way too, any leakage occurring from a pressurized fluid side, such as from a variable pressure volume part, to other parts of the system can be suitably countered.

The embodiments of the invention shown are intended merely as explanations and not as restrictions. The invention and its scope of protection rather result from the claims which follow.

The invention claimed is:

1. A milking robot for fully automatic milking or milking animals, comprising:
   at least one movable component;
   a cylinder configured to support a movement of at least one movable component,
   wherein the cylinder has a cylinder wall with a ventilation opening and a cylinder rod that is movable in and out of the cylinder,
   wherein the cylinder wall surrounds at least one variable volume part, the variable volume part is free from pressurized fluid connections for movement of the cylinder rod and is also configured, via the ventilation opening, to remain in virtual pressure equilibrium with an environment of the cylinder,
   wherein a gas capture device circumscribed the ventilation opening on the cylinder wall, and the gas capture device has a variable volume, and the gas capture device together with the variable volume part forms an air-tight gas volume.

2. The milking robot as claimed in claim 1, wherein the gas capture device is connected to the variable volume part in gas connection via a pipe or line circumscribing the ventilation opening.

3. The milking robot as claimed in claim 1, wherein the gas capture device comprises a movable gas capture pouch.

4. The milking robot as claimed in claim 3, wherein the gas capture pouch is arranged in a form-stable outer housing.

5. The milking robot as claimed in claim 1, wherein the gas capture device has a volume which, by supply of gas from the variable volume part of the cylinder, is variable between a minimum and a maximum volume, wherein a gas pressure in the gas capture device on reaching the maximum volume amounts to maximum 0.2 bar.

6. The milking robot as claimed in claim 1, wherein the cylinder is a pressure cylinder, which pressure cylinder, besides the variable volume part, comprises a variable pressure volume part for receiving a pressurized fluid comprising oil or compressed air.

7. The milking robot as claimed in claim 6, wherein the pressure cylinder is a balancing cylinder for supporting a weight of at least a part of a robot arm.

8. The milking robot as claimed in claim 6, wherein the milking robot comprises a pneumatic, hydraulic or hydropneumatic drive configured for moving a pressurized fluid to or from the pressure volume part.

9. The milking robot as claimed in claim 6, wherein a filter is placed between the variable volume part of each pressure cylinder and between the gas capture device and the variable volume part of any non-pressure cylinder, wherein the filter is configured to filter a gas flowing through.

10. The milking robot as claimed in claim 1, wherein the cylinder has an electric, magnetic or electromagnetic drive for extending or retracting the cylinder rod.

11. The milking robot as claimed in claim 1, comprising several cylinders configured to support movement of at least one movable component that are each connected with a respective at least one variable volume part to one common gas capture device.

12. The milking robot as claimed in claim 11, wherein the several cylinders comprise at least one first cylinder without a respective variable pressure volume part, and at least one second cylinder with a respective variable pressure volume part, wherein all of the first cylinders are connected to a common first gas capture device, and all of the second cylinders are connected to a common second gas capture device.

13. The milking robot as claimed in claim 1, wherein the gas capture device and the at least one variable volume part communicating therewith is filled with a gas, wherein the gas has a pressure of around 1 atmosphere.

14. The milking robot as claimed in claim 1, comprising a milking stall with an entry door and an exit door, and a robot arm for performance of animal-related actions on a milking animal in the milking stall, connection of a teat cup, and wherein at least one cylinder is provided in said entry door, said exit door and said robot arm.

15. The milking robot as claimed in claim 3, wherein the gas capture pouch is arranged in a pipe of the milking robot.

16. The milking robot as claimed in claim 6, wherein the pressure cylinder is a hydropneumatic cylinder.

17. The milking robot as claimed in claim 6, wherein the pressure cylinder is a hydraulic cylinder.

* * * * *